(12) United States Patent
Damm et al.

(10) Patent No.: US 7,808,887 B2
(45) Date of Patent: Oct. 5, 2010

(54) BRIDGE/ROUTER AND METHOD FOR AVOIDING PACKET REPLICATION DURING A FAILURE IN A NETWORK

(75) Inventors: Gerard Damm, Plano, TX (US); Kamakshi Sridhar, Plano, TX (US); John Coulter, Richmond (CA); Gino Dion, Embrun (CA)

(73) Assignee: Alcatel Lucent, Paris (FR)

( * ) Notice: Subject to any disclaimer, the term of this patent is extended or adjusted under 35 U.S.C. 154(b) by 949 days.

(21) Appl. No.: 11/466,516

(22) Filed: Aug. 23, 2006

(65) Prior Publication Data

US 2008/0049763 A1    Feb. 28, 2008

(51) Int. Cl.
*H04L 12/28* (2006.01)
(52) U.S. Cl. ..................................... 370/216
(58) Field of Classification Search ........................ None
See application file for complete search history.

(56) References Cited

U.S. PATENT DOCUMENTS

| | | | | |
|---|---|---|---|---|
| 6,879,594 | B1 * | 4/2005 | Lee et al. ..................... | 370/408 |
| 7,447,167 | B2 * | 11/2008 | Nadeau et al. ............... | 370/254 |
| 2003/0026209 | A1 * | 2/2003 | Katz ........................... | 370/238 |
| 2005/0018668 | A1 * | 1/2005 | Cheriton ..................... | 370/389 |
| 2006/0045007 | A1 * | 3/2006 | Huck ........................... | 370/226 |
| 2006/0120396 | A1 * | 6/2006 | Hasegawa et al. ........... | 370/432 |
| 2006/0218262 | A1 * | 9/2006 | Abeta et al. ................. | 709/223 |
| 2008/0031130 | A1 * | 2/2008 | Raj et al. .................... | 370/225 |
| 2009/0028044 | A1 * | 1/2009 | Windisch et al. ............ | 370/225 |

OTHER PUBLICATIONS

W. Augustyn et al. "Service Requirements for Layer 2 Provider Provisioned Virtual Private Networks", draft-ietf-l2vpn-vpls-requirements-07.txt, Jun. 2006, pp. 1-44.
K. Kompella et al. "Virtual Private LAN Service (VPLS) Using BGP for Auto-Discovery and Signaling", draft-ietf-l2vpn-vpls-bgp-08.txt, Jun. 21, 2006, pp. 1-37.
M. Lasserre et al. "Virtual Private LAN Services Using LDP", draft-ietf-l2vpn-vpls-ldp-09.txt, Jun. 2006, pp. 1-49.

* cited by examiner

*Primary Examiner*—Chirag G Shah
*Assistant Examiner*—Amarnauth Persaud
(74) *Attorney, Agent, or Firm*—Galasso & Associates, LP (57) ABSTRACT

A bridge/router and method are described herein that are capable of avoiding packet replication at layer 2 where there is a failure in a network. In one embodiment, the bridge/router is informed about a fault which occurred within the network. Then, the bridge/router makes a determination about whether or not multiple LSPs would be used to flood/carry the same IP traffic out off a single port. If yes, the first bridge/router chooses one of the LSPs to carry the IP traffic out the single port and then prevents the IP traffic from being carried on the remaining LSP(s) out the single port which avoids the packet replication on a link which is associated with the single port. If no, then the first bridge/router allows the IP traffic to be carried on the LSPs out off more than one port.

12 Claims, 8 Drawing Sheets

BRIDGE/ROUTER AND METHOD FOR AVOIDING PACKET REPLICATION DURING A FAILURE IN A NETWORK

BACKGROUND OF THE INVENTION

1. Field of the Invention

The present invention is related to a bridge/router and a method for avoiding packet replication during a failure in a network. In one embodiment, the network is a video hub office which is associated with the distribution of IP television to homes.

2. Description of Related Art

The following abbreviations are herewith defined, at least some of which are referred to in the ensuing description of the prior art and the present invention.

Figure 1:
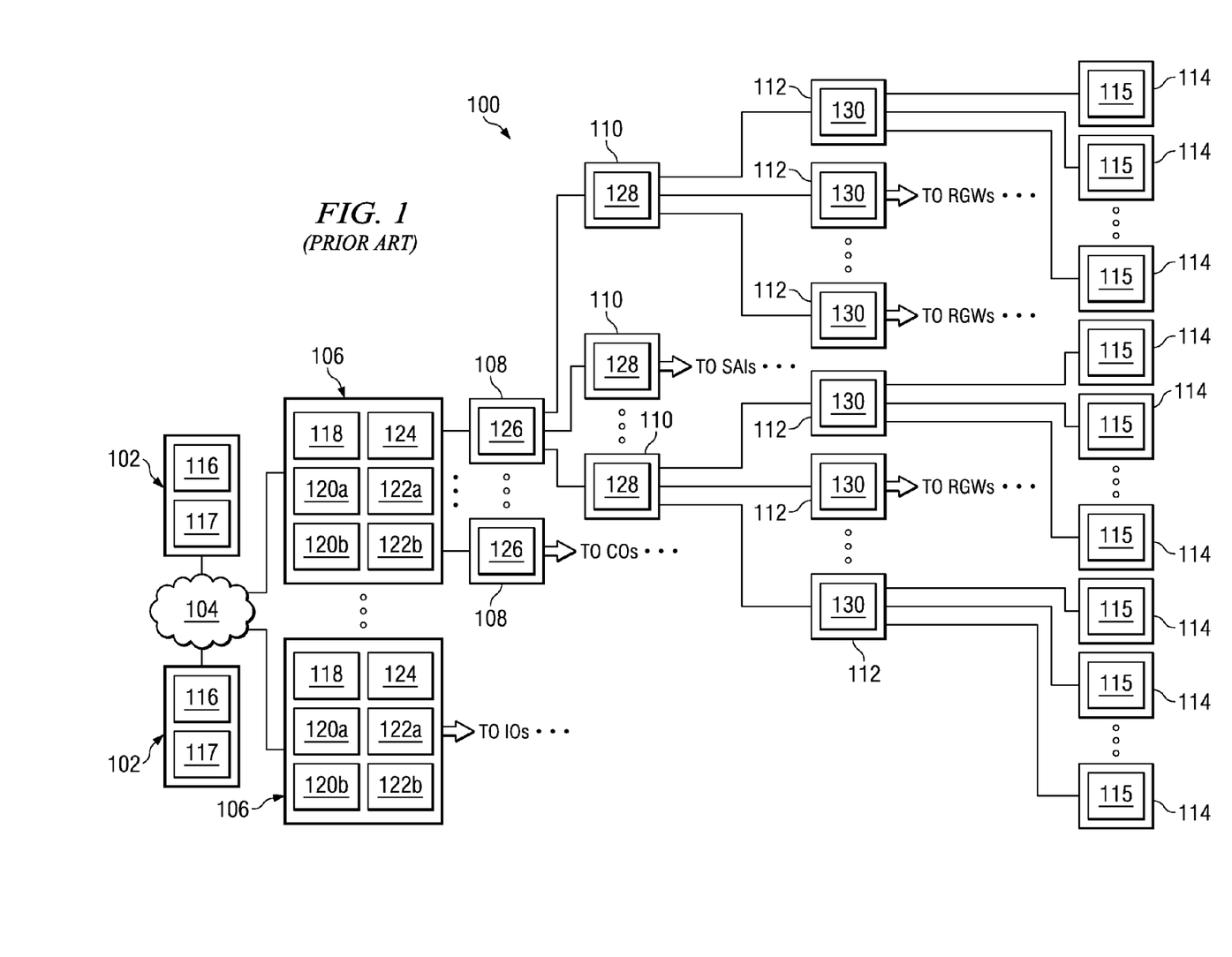
FIG. 1 (PRIOR ART) is a block diagram that illustrates the basic components of an exemplary transport network which provides broadcast TV channels to homes via DSL phone lines.

BTV Broadcast Television
CO Central Office
DSL Digital Subscriber Line
DSLAM Digital Subscriber Line Access Multiplexer
FDB Forwarding Database
Gbps Giga-bits-per-second
IP Internet Protocol
MPLS Multi-Protocol Label Switching
PIM Protocol-Independent Multicast
RGW Residential Gateway
SAI Service Area Interface
SHE Super Headend
STB Set-Top Box
TV Television
VHO Video Hub Office
VoD Video-On-Demand
VRRP Virtual Router Redundancy Protocol Referring to FIG. 1 (PRIOR ART), there is a block diagram that illustrates the basic components of an exemplary transport network 100 which can provide broadcast TV channels to homes via for example DSL phone lines. The exemplary transport network 100 shown includes two super head-ends 102, a backbone network 104, multiple VHOs 106, multiple IOs 108, multiple COs 110, multiple SAIs 112 and multiple RGWs 114. In operation, each super head-end 102 (which includes a router 116 and an acquisition server 117) receives international/national TV feeds and supplies those international/national TV feeds via the backbone network 104 to each VHO 106. Then, each VHO 106 (which includes an acquisition server 118, a first bridge/router 120a, a second bridge/router 120b, a first router 122a, a second router 122b and a VoD server 124) receives regional/local TV feeds and multicasts all of the TV feeds to their respective IOs 108. And, each IO 108 (which includes a router 126) then multicasts all of the TV feeds to their respective COs 110. Then, each CO 110 (which includes an bridge/router 128) multicasts all of the TV feeds to their respective SAIs 112. And, each SAI 112 (which includes a DSLAM 130) then sends a few TV feeds out of all the possible TV feeds to their respective RGWs 114 (which are associated with STBs 115). Thus, users can interface with their STB 115 and select one of the multicast TV channels to watch on their television set. The transport network 100 can also provide voice (telecommunications) and data (Internet) to the homes.

Figure 2A:
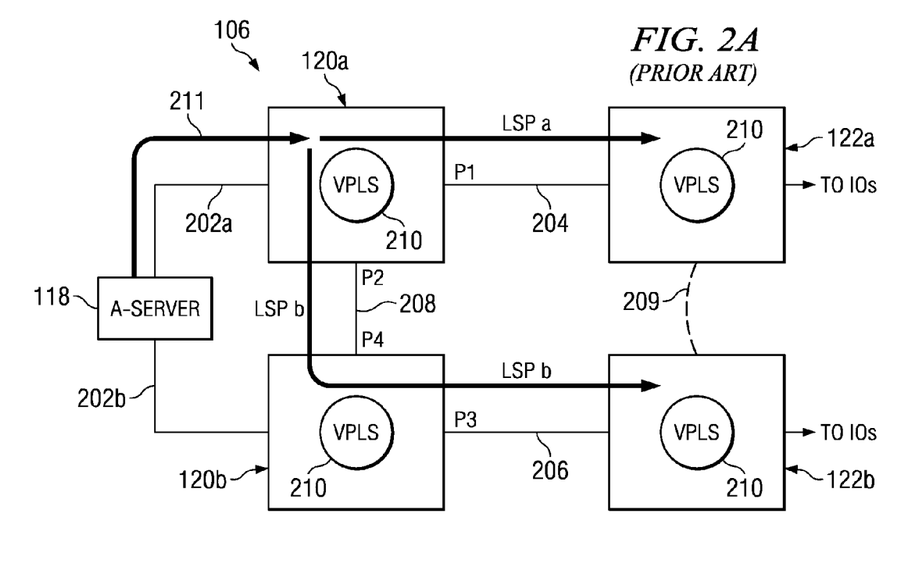
FIGS. 2A and 2B (PRIOR ART) are two block diagrams of a traditional VHO (which is used in the transport network shown in FIG. 1) which has a data replication/bandwidth problem which will be solved by a VPLS optimization method in accordance with the present invention.
Figure 2B:
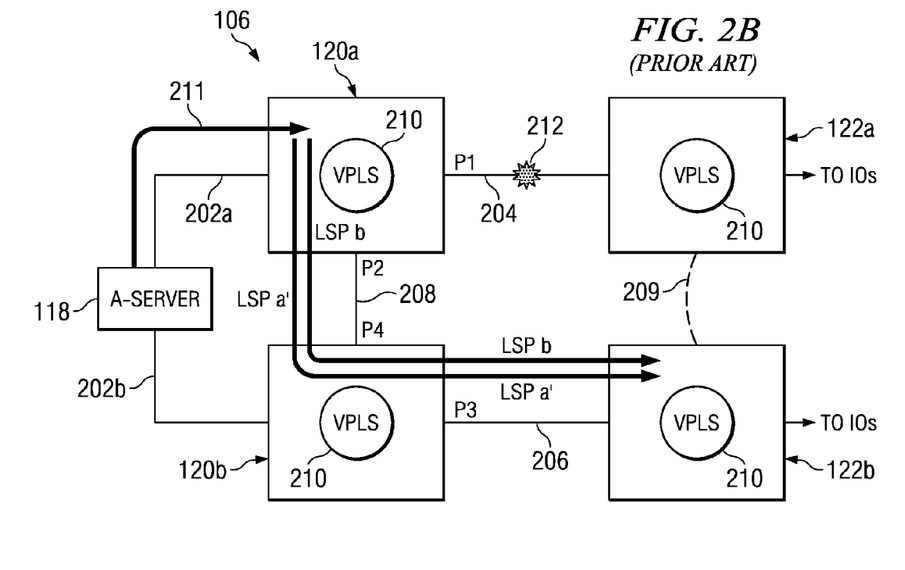

Referring to FIGS. 2A and 2B (PRIOR ART), there are two block diagrams illustrating the basic components within the traditional VHO 106 that has a data replication/bandwidth problem which will be solved by the present invention. In this example, the VHO 106 has an acquisition server 118 which is connected by two links 202a and 202b respectively to the first bridge/router 120a and the second bridge/router 120b. The first bridge/router 120a is connected by link 204 to the first router 122a. The second bridge/router 120b is connected by link 206 to the second router 122b. The first bridge/router 120a and the second bridge/router 120b are connected to one another via link 208. The first router 122a and the second router 122b are shown as being associated to one another via a VRRP 209 (which is a redundancy protocol that allows one or more routers (e.g., router 122b) to serve as standby/backup routers to a primary/master router (e.g., router 122a), and replace it automatically in case of failure; also, the group of redundant routers (e.g., routers 122a and 122b) are identified by a unique virtual IP address). And, the first bridge/router 120a, the second bridge/router 120b, the first router 122a and the second router 122b have a VPLS instance 210 (which is an emulation of Ethernet layer 2 network over IP/MPLS) operating between themselves. For a detailed discussion about VPLS, reference is made to the following drafts from the L2VPN working group of the IETF: draft-ietf-12vpn-requirements-07.txt, draft-ietf-12vpn-vpls-ldp-09.txt, draft-ietf-12vpn-vpls-bgp-08.txt (the contents of which are incorporated by reference herein). The VoD server 124 is not shown in these drawings or discussed herein since it is not relevant to the present invention.

In FIG. 2A (PRIOR ART), the VHO 106 is shown in a normal operating condition where the acquisition server 118 sends layer 3 IP multicast traffic 211 (e.g., TV feeds 211) to the first bridge/router 120a (e.g., VPLS edge bridge/router 120a). The first bridge/router 120a floods the received multicast IP traffic 211 on LSP_a towards the first router 122a (which is the PIM designated router 122a) and on LSP_b towards the second router 122b via the second bridge/router 120b (note: LSPs can be configured manually and the VPLS instance 210 automatically uses the LSPs to create pseudo-wires which are tunneled in the LSPs). This flooding results from the VPLS layer, which (as a bridge) replicates multicast traffic 211 to all outgoing ports because a multicast MAC address is never learned by a bridge source MAC learning function. In this situation, the LSP (and pseudo-wire) plays the role of a virtual L2 port for a VPLS virtual bridge. Again, this is the normal operating condition of the VHO 106 and there is no data replication/bandwidth problem.

In FIG. 2B (PRIOR ART), the VHO 106 is shown in a failed operating condition where there is a fault 212 on link 204 between the first bridge/router 120a and the first router 122a. The first bridge/router 120a implements MPLS so it knows about the fault 212 and in response it activates a backup LSP_a' which carries the same IP multicast traffic 211 on links 206 and 208 via the second bridge/router 120b towards the second router 122b (which is now the PIM designated router 122b—why this is the case will be discussed in detail below). As can be seen, the first bridge/router 120a activates the backup LSP_a' on the same port "p2" as the primary LSP_b and sends the same IP multicast traffic 211 to the second router 122b. This leads to packet replication on two links 206 and 208 which is unnecessary and wasteful. In addition, the physical links 206 and 208 (plus the other link 204) need to be over-dimensioned (e.g., from a 1 Gbps Ethernet link to a 10 Gbps Ethernet link—since there is no smaller increment with Ethernet links) to address this traffic replication/bandwidth problem. The over-dimensioned links 204, 206 and 208 result in increased costs. This traffic replication/bandwidth problem occurs in other architectures as well and is solved by the enhanced VPLS bridge/router and method of present invention.

BRIEF DESCRIPTION OF THE INVENTION

The present invention includes a bridge/router and a method that are capable of avoiding packet replication at layer 2 when there is a failure in a network. In one embodiment, the bridge/router is informed about a fault which occurred within the network. Then, the bridge/router makes a determination about whether or not multiple LSPs would be used to flood/carry the same IP traffic out off a single port. If yes, the first bridge/router chooses one of the LSPs to carry the IP traffic out the single port and then prevents the IP traffic from being carried on the remaining LSP(s) out the single port which avoids the packet replication on a link which is associated with the single port. If no, then the first bridge/router allows the IP traffic to be carried on the LSPs out off more than one port.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 3A:
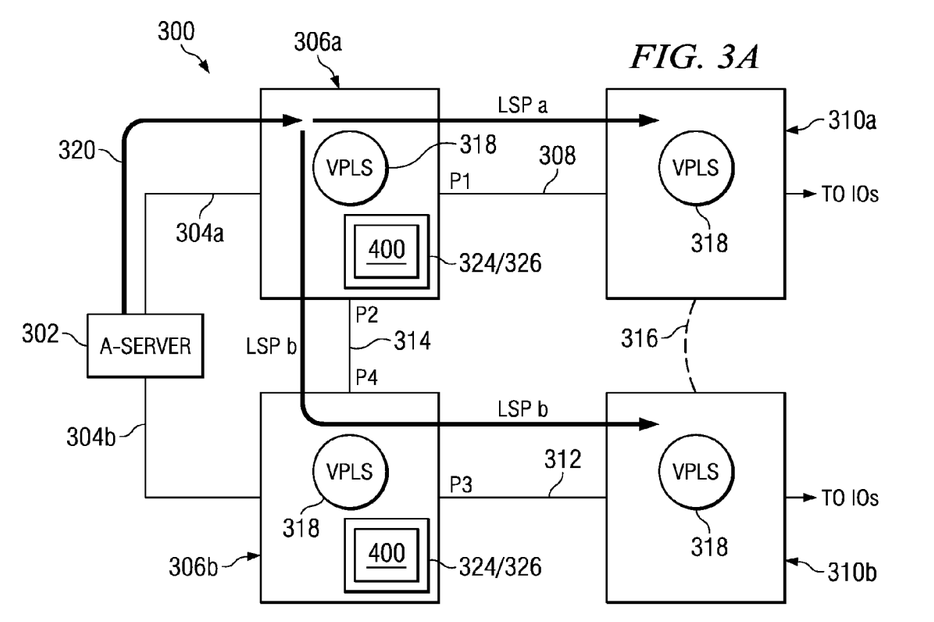
FIGS. 3A and 3B are two block diagrams of an enhanced VHO (which could be used in the transport network shown in FIG. 1) that implements the VPLS optimization method which solves the data replication/bandwidth problem in accordance with the present invention.
Figure 3B:
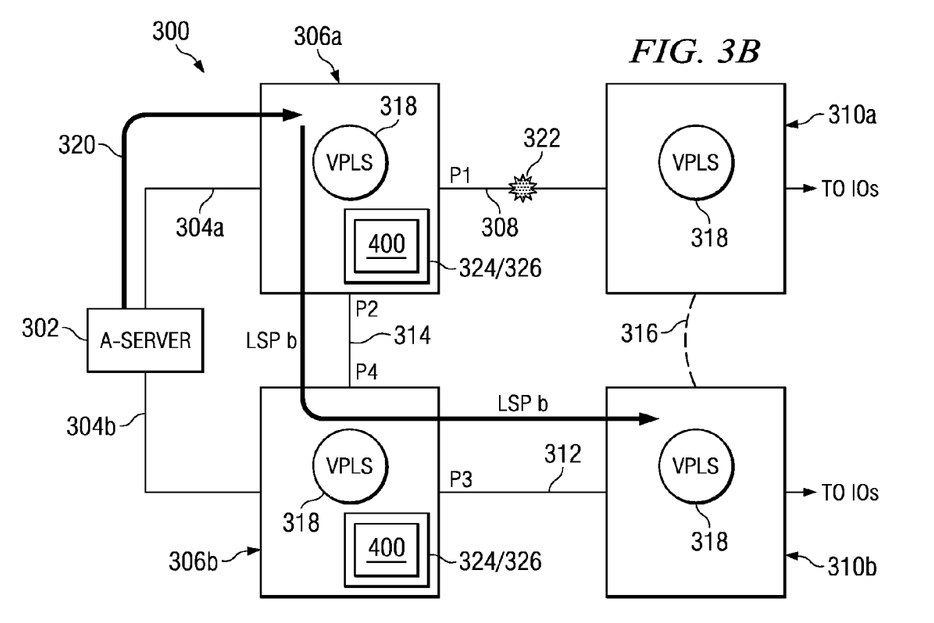

Referring to FIGS. 3A and 3B, there are two block diagrams of an exemplary VHO 300 which implements a VPLS optimization method 400 to solve the aforementioned data replication/bandwidth problem in accordance with the present invention. The VHO 300 has an acquisition server 302 which is connected by two links 304a and 304b respectively to the first bridge/router 306a and the second bridge/router 306b. The first bridge/router 306a is connected by link 308 to a first router 310a. The second bridge/router 306b is connected by link 312 to a second router 310b. The first bridge/router 306a and the second bridge/router 306b are connected to one another via link 314. The first router 310a and the second router 310b are shown as being connected to one another via a VRRP 316. And, the first bridge/router 306a, the second bridge/router 306b, the first router 310a and the second router 310b have a VPLS instance 318 (which is an emulation of Ethernet layer 2 network over IP/MPLS) operating between themselves. The VHO 300 would typically incorporate a VoD server as well but this is not shown or discussed herein since it is not relevant to the present invention.

In FIG. 3A, the enhanced VHO 300 is shown in a normal operating condition where the acquisition server 302 sends layer 3 IP multicast traffic 320 (e.g., TV feeds 320) to the first bridge/router 306a (e.g., VPLS edge bridge/router 306a). The first bridge/router 306a floods the received multicast IP traffic 320 on LSP_a towards the first router 310a (which is the PIM designated router 310a) and on LSP_b towards the second router 310b via the second bridge/router 306b. Again, this is the normal operating condition of the enhanced VHO 300 and there is no data replication/bandwidth problem (compare to the traditional VHO 106 shown in FIG. 2A).

In FIG. 3B, the enhanced VHO 300 is shown in a failed operating condition where in this example there is a fault 322 on link 308 between the first bridge/router 306a and the first router 310a. The first bridge/router 306a implements MPLS so it knows about the fault 322 and in response it activates a backup LSP_a' (not shown) which would in the past carry the same IP multicast traffic 320 on links 312 and 314 via the second bridge/router 306b towards the second router 310b (which is now the PIM designated router 310b—why this is the case will be discussed in detail below). However, in accordance with the present invention, the first bridge/router 306a would not actually use the backup LSP_a' to carry the IP multicast traffic 320 to the second router 310b. Because, the first bridge/router 306a (which implements the VPLS optimization method 400) would suppress/prevent the transmission of IP multicast traffic 320 on the backup LSP_a' towards the second router 310b. A detailed discussion is provided next about how the first bridge/router 306a which implements the VPLS optimization method 400 can avoid the packet replication/bandwidth problem which would occur if the same IP multicast traffic 320 would be carried on both LSP_a' and LSP_b to the second router 310b (compare to the traditional VHO 106 shown in FIG. 2B).

Figure 4:
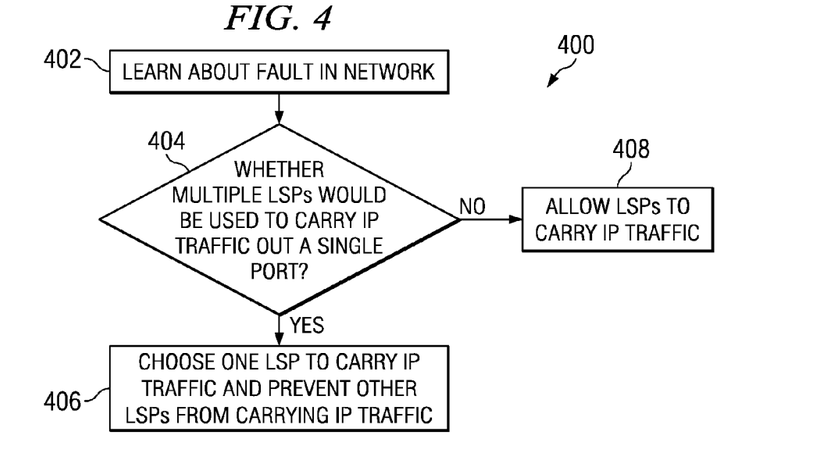
FIG. 4 is a flowchart that illustrates the basic steps of the VPLS optimization method in accordance with the present invention.

The first bridge/router 306a (and the second bridge/router 306a) has a memory 324 which stores instructions that are processable by a processor 326 to facilitate the various steps of the VPLS optimization method 400 (see FIG. 4). Beginning at step 402, the first bridge/router 306a is informed about a fault which occurred within the VHO 300 (which is a network). In the example associated with FIG. 3B, the first bridge/router 306a implements MPLS which detects the fault 322 located on link 308 which connects the first bridge/router 306a and the first router 310a. At step 404, the first bridge/router 306a makes a determination about whether or not multiple LSPs would be used to carry/flood the same IP traffic 320 out off a single port (e.g., "database sweeper" software can be used to perform this particular step). If the result of step 404 is yes, then the first bridge/router 306a chooses one of the LSPs to carry the IP traffic 320 out the single port and suppresses/prevents the IP traffic 320 from being carried on the remaining LSP(s) out the single port (step 406). In the aforementioned example, the first bridge/router 306a would determine that more than one LSP, namely LSP_a' and LSP_b, would be used to flood the IP traffic 310 through a single port "p2" (LSP_a' is shown in FIG. 2B). As a result, the first bridge/router 306a would suppress/prevent the IP traffic 320 from being carried on the backup LSP_a' towards the second router 310b (see FIG. 3B). If the result of step 404 is no, then the first bridge/router 306a would allow the IP multicast traffic 320 to be carried on the LSPs because those LSPs would not be carrying/flooding the IP multicast traffic 320 out a single port (step 408). This scheme is a marked improvement over the prior art which suffered from the aforementioned traffic replication/bandwidth problem (compare FIGS. 2B and 3B).

The first bridge/router 306a (and the second bridge/router 306b) has two different ways it can use to implement step 406 and choose which LSP(s) should be prevented to carry the IP multicast traffic 320 out the single port and which LSP should be allowed to carry the IP multicast traffic 320 out the signal port. The two different ways are described next:

1. Solution 1—Architecture Specific: Knowing a given network topology, it is possible to list all of the failure scenarios and identify in advance which LSP is to be used to send IP multicast traffic out a single port towards the first router 310a (if it is the PIM designated router) or the second router 310b (if it is the PIM designated router). In one embodiment, the failure scenarios are characterized within tables in a VPLS virtual bridge FDB, and the rules to determine the specific LSP(s) on which the IP multicast traffic 320 need to be suppressed are hard-coded in the first bridge/router 306a (and the second router/bridge 306b). There is no need for the first bridge/router 306a (and the second bridge/router 306b) to know which router 310a or 310b is the PIM designated router because this information is located in the hard-coded rules (see discussion below for more details about the PIM designated router).

2. Solution 2—Generic Architecture (based on PIM-Snooping): This solution is not limited to a particular network topology, but requires the first bridge/router 306a and the second bridge/router 306b to implement PIM snooping of the PIM-Hello messages sent by the first router 310a and the second router 310b (see FIG. 10) (note: this configuration is an example and it should be appreciated that there could be any number of bridge/routers and routers, and any kind of physical links and logical LSPs located between all of them to form a VPLS instance where the only condition is that the PIM-Hellos are properly distributed everywhere). The first router 310a and the second router 310b send PIM-Hello messages to one another so that they can determine/elect which of them is going to be the PIM designated router. By PIM-snooping the PIM-Hello messages, the first bridge/router 306a and the second bridge/router 306b can ascertain by themselves which is the elected PIM designated router 310a or 310b. And, if there is the potential for traffic replication, then the first bridge/router 306a or the second bridge/router 306b can suppress/prevent the IP multicast traffic 320 from being carried on the LSP(s) which do not lead to that PIM designated router 310a or 310b. In one embodiment, the first bridge/router 306a and the second bridge/router 306b use "IP-aware" software to perform the PIM snooping.

In both solutions, the LSPs are not affected (i.e., torn down) which is an advantage since creating an LSP requires resources (a human network administrator, or the existence and deployment of a protocol). Instead, the IP multicast traffic 320 is not sent on the suppressed LSPs that do not lead to the PIM designated router 310a or 310b. Also, the first bridge/router 306a and the second bridge/router 306b do not need to remember any state information because when the original LSP becomes active again, then new LSP/interfaces conditions are created and the same rules associated with the VPLS optimization method 400 would still apply, i.e. if no suppression is needed to avoid replicating traffic, then there will not be any suppression.

A discussion is provided next to describe in detail each fault scenario that could occur within the exemplary VHO 300 and to describe in detail how the VPLS optimization method 400 would address each of those fault scenarios to prevent the duplication of IP multicast traffic 320. To help explain how the VPLS optimization method 400 addresses the various fault scenarios within the enhanced VHO 300, reference is made to the description below that is associated with FIGS. 5-9 and TABLE 1.

Figure 5:
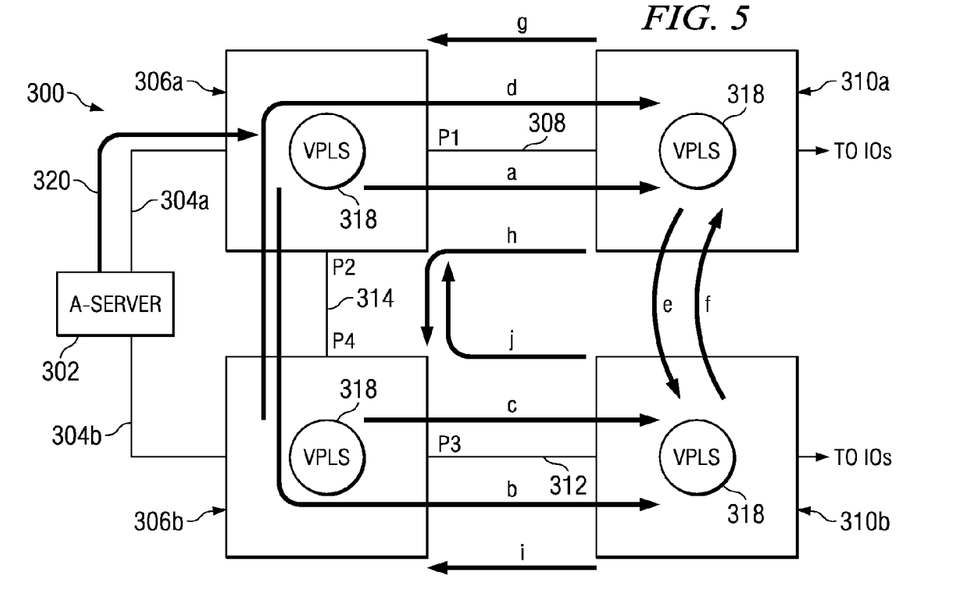
FIG. 5 is a diagram of the enhanced VHO operating in a normal condition with no faults during which the VPLS optimization method would not have to be implemented in accordance with the present invention.

FIG. 5 illustrates the exemplary VHO 300 in a normal operating condition where a number of LSPs namely LSP_a through LSP_j have been established to form the VPLS instance 318 between the first bridge/router 306a, the second bridge/router 306b, the first router 310a and the second router 310b. In the normal operating condition, the A-server 302 selects only one bridge/router 306a or 306b to distribute the IP multicast traffic 320. Normally, the A-server 302 selects the first bridge/router 306a for this role while the second bridge/router 306b is there for redundancy in case there is a failure with the first bridge/router 306a (see fault no. 5 in FIG. 6). In this situation, the first bridge/router 306a floods at layer 2 the IP multicast traffic 320 on LSP_a (via port "p1") and LSP_b (via port "p2") to respectively reach the first router 310a and the second router 310b.

Figure 6:
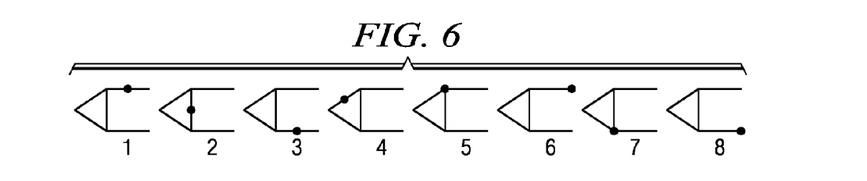
FIG. 6 is a diagram that illustrates the eight possible failures which could occur within the enhanced VHO shown in FIGS. 3A and 3B.

FIG. 6 illustrates eight possible failures which could occur within this particular architecture of the VHO 300 (only single failures are discussed herein). Of these eight possible failures: three of the failures occur on the links 308, 312 and 314 (see failure nos. 1-3); one of the failures occurs on link 304a (see failure no. 4); and four of the failures occur in the first bridge/router 306a, the second bridge/router 306b, the first router 310a and the second router 310b (see failure nos. 5-8). Only three of these failures lead to the problematical traffic replication on a single link and these failures occur on the links 308, 312 and 314 (see failure nos. 1-3). How the first bridge/router 306a implements the VPLS optimization method 400 and the aforementioned solution no. 1 such that failure nos. 1-3 will not cause traffic replication on a single link 314 is described next with reference to FIGS. 7A-7C.

Figure 7A:
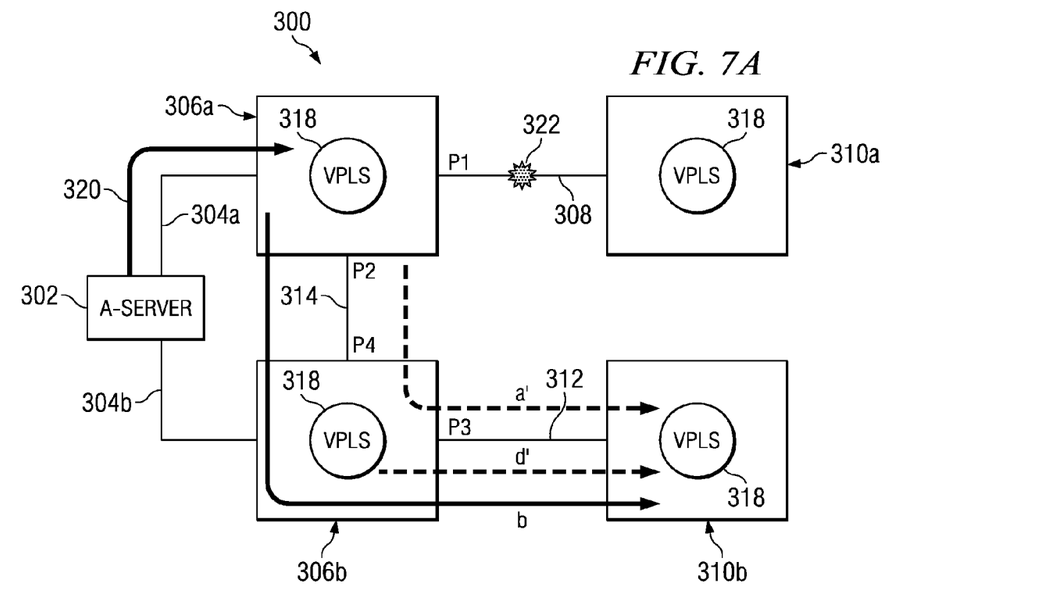
FIGS. 7A-7C are diagrams of the enhanced VHO which are used to explain how one embodiment of the VPLS optimization method (which utilizes solution no. 1) can prevent the data replication/bandwidth problem in accordance with the present invention.

FIG. 7A is a diagram of the VHO 300 in which there is a failure 322 on the link 308 located between the first bridge/router 306a and the first router 310a (failure no. 1 in FIG. 6). In the first 50 ms (or so) after the failure, the following occurs:

MPLS notices the failure 322 on link 308.

MPLS switches the impacted LSP_a and LSP_d to their backup LSP_a' and LSP_d' (FIG. 5 shows non-impacted LSP_a and LSP_b) (no back-up LSPs are adjusted for impacted LSPs g, h, e and f because they are associated with PIM-Hellos—discussed below with respect to solution no. 2).

Then, within the first 50+processing_time ms after the failure, the following occurs:

The first bridge/router 306a (in particular the VPLS optimization method 400) is informed about the failure 322 (step 402).

The first bridge/router 306a accesses the VPLS virtual bridge FDB and determines that multiple LSPs, namely LSP_b and LSP_a', would be used to flood/carry the same IP multicast traffic 320 out a single port "p2" (step 404).

The first bridge/router 306a has hard-coded rules that indicate that LSP_a' is for the first router 310a and that LSP_b is for the second router 310b (which is also the PIM designated router) and as a result suppresses the IP multicast traffic 320 on LSP_a' (see step 406) (Note: LSP_d is used only by bridge/router 306b when it has traffic (i.e. when it is selected by the A-server 302 so in this particular failure the LSP_d is replaced by LSP_d' neither of which has any traffic).

Figure 7B:
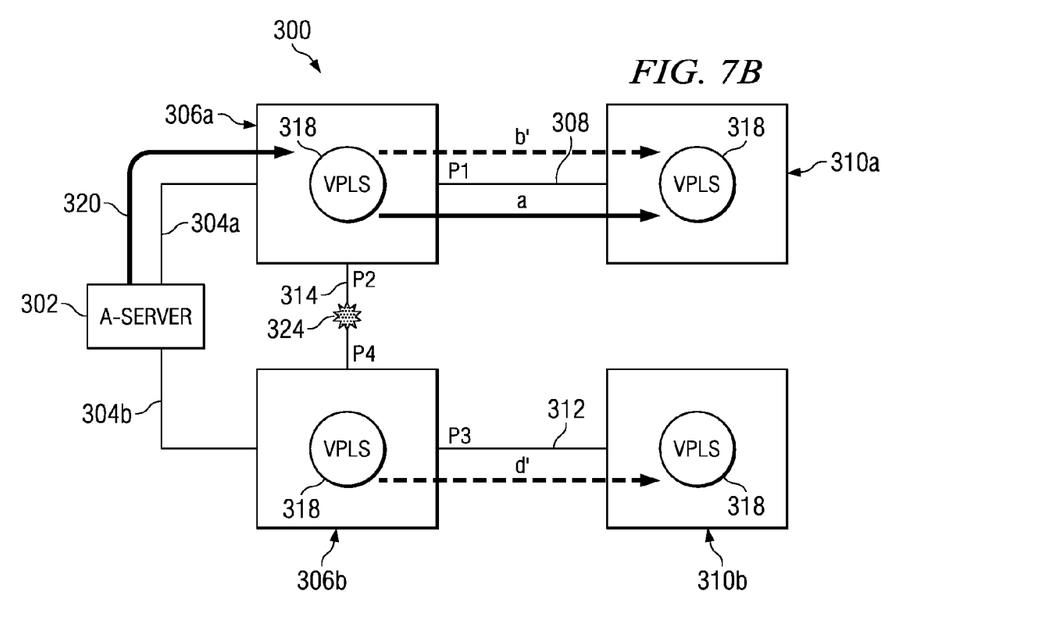

FIG. 7B is a diagram of the VHO 300 in which there is a failure 324 on the link 314 located between the first bridge/router 306a and the second bridge/router 306b (failure no. 2 in FIG. 6). In the first 50 ms (or so) after the failure, the following occurs:

MPLS notices the failure 324 on link 314.

MPLS switches the impacted LSP_b and LSP_d to their backup LSP_b' and LSP_d' (FIG. 5 shows non-impacted LSP_b and LSP_d) (no back-up LSPs are activated for impacted LSPs h, j, e and f because they are associated with PIM-Hellos—discussed below with respect to solution no. 2).

Then, within the first 50+processing_time ms after the failure, the following occurs:

The first bridge/router 306a (in particular the VPLS optimization method 400) is informed about the failure 324 (step 402).

The first bridge/router 306a accesses the VPLS FDB and determines that multiple LSPs, namely LSP_a and LSP_b', would be used to flood/carry the same IP multicast traffic 320 out a single port "p1" (step 404).

The first bridge/router 306a has hard-coded rules that indicate LSP_a is for the first router 310a (which is also the PIM designated router) and that LSP_b' is for the second router 310b and as a result suppresses the IP multicast traffic 320 on LSP_b' (see step 406).

Figure 7C:
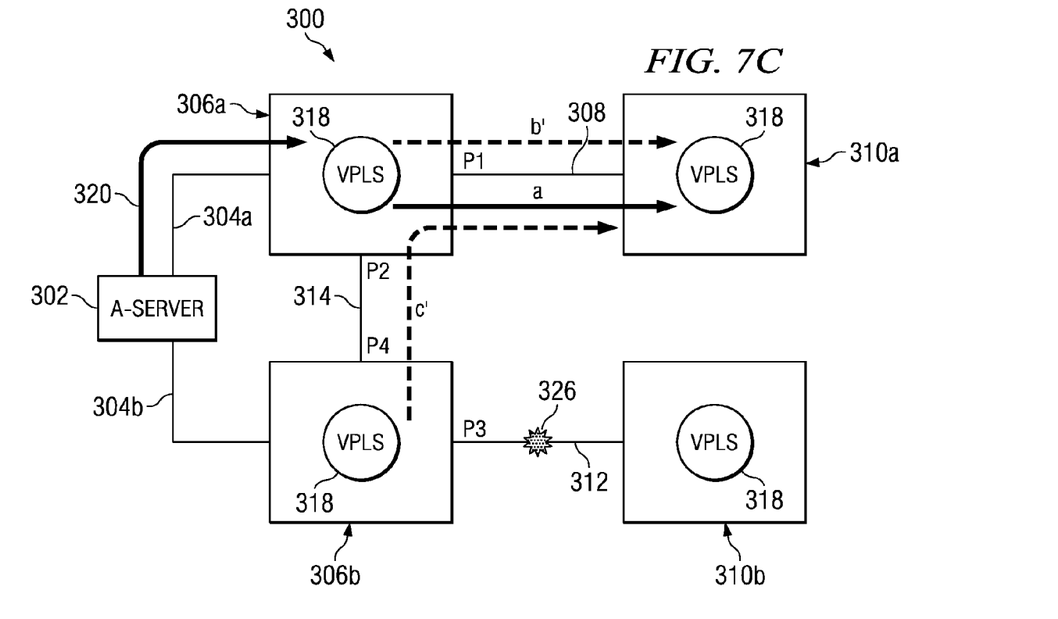

FIG. 7C is a diagram of the VHO 300 in which there is a failure 326 on the link 312 located between the second bridge/router 306b and the second router 310b (failure no. 3 in FIG. 6). In the first 50 ms (or so) after the failure, the following occurs:

MPLS notices the failure 326 on link 312.

MPLS switches the impacted LSP_b and LSP_c to their backup LSP_b' and LSP_c' (FIG. 5 shows non-impacted LSP_b and LSP_c) (no back-up LSPs are activated for impacted LSPs i, j, e and f because they are associated with PIM-Hellos—discussed below with respect to solution no. 2).

Then, within the first 50+processing_time ms after the failure, the following occurs:

The first bridge/router 306a (in particular the VPLS optimization method 400) is informed about the failure 326 (step 402).

The first bridge/router 306a accesses the VPLS FDB and determines that multiple LSPs, namely LSP_a and LSP_b', would be used to flood/carry the same IP multicast traffic 320 out a single port "p1" (step 404).

The first bridge/router 306a has hard-coded rules that indicate LSP_a is for the first router 310a (which is also the PIM designated router) and that LSP_b' is for the second router 310b and as a result suppresses the IP multicast traffic 320 on LSP_b' (see step 406).

As can be seen, the first bridge/router 306a resolves these three fault scenarios by: (1) inspecting the VPLS FDB; and (2) determining which LSP(s) needs to have the IP multicast suppressed thereon by referring to these hard-coded rules:

--- if (LSP a' on p2 and LSP b on p2 are active) then
    suppress traffic on LSP a'
endif
if (LSP a on p1 and LSP b' on p1 are active) then
    suppress traffic on LSP b'
endif
In all other LSP/port situations, no suppression is forced.

---

A discussion is provided next to help explain how the first bridge/router 306a can implement the VPLS optimization method 400 and the aforementioned solution no. 2 so that failure nos. 1-3 will not cause traffic replication on a single link 308, 312 or 314. In this case, the first bridge/router 306a (and the second bridge/router 306b) need to perform PIM-Snooping to ascertain whether the first router 310a or the second router 310b is the current PIM designated router.

The first bridge/router 306a can ascertain the current PIM designated router based on whether or not it receives PIM-Hellos from the first router 310a and the second router 310b. For instance, if the first bridge/router 306a receives PIM-Hellos from both the first router 310a or the second router 310b then it ascertains which one is the PIM designated router by looking at the IP address or the priority of the received PIM-Hellos (i.e., the router that sends the PIM-Hello with the lowest IP address or the highest priority is the PIM designated router). If the first bridge/router 306a receives PIM-Hellos from only the second router 310b then it ascertains that the second router 310b is the PIM designated router. In contrast, the first router 310a and the second router 310b exchange PIM-Hellos between themselves so they can elect which of them is actually going to be the PIM designated router.

Figure 8:
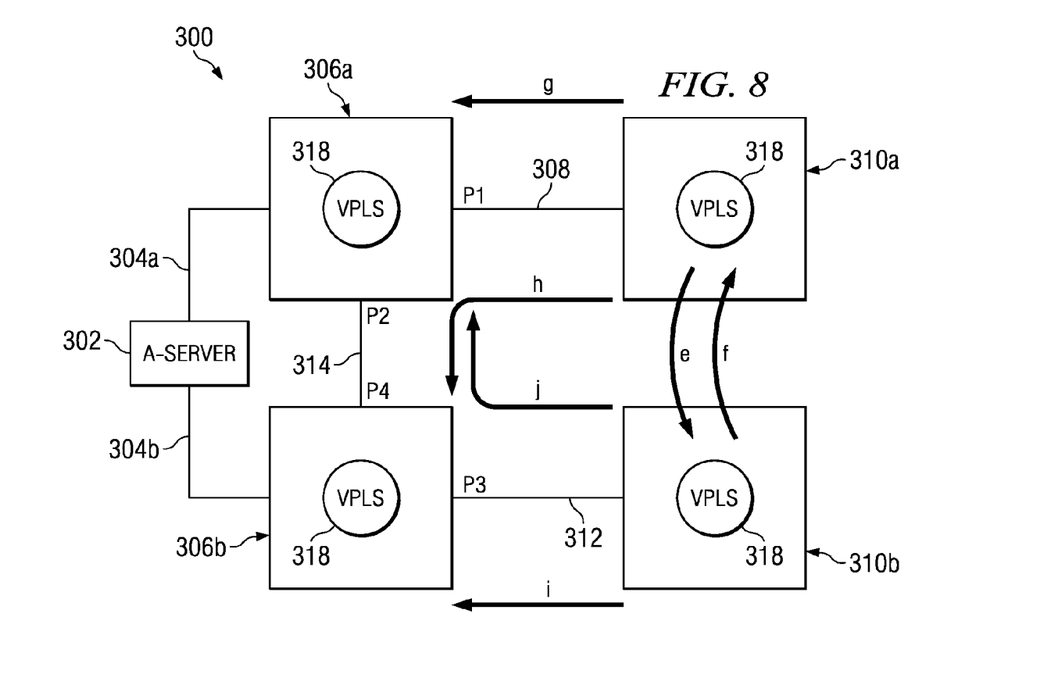
FIG. 8 is a diagram illustrating the various PIM-Hello messages transmitted within the enhanced VHO shown in FIGS. 3A and 3B.

How the first bridge/router 306a (and the second bridge/router 306b) performs PIM-Snooping to ascertain the PIM designated router will become even more apparent after reading the description that is provided below with respect to FIGS. 8-9 and TABLE 1. FIG. 8 is a diagram of the enhanced VHO 300 that illustrates the various PIM-Hellos which are transmitted on LSP_e through LSP_j from both the first router 310a and the second router 310b. The first bridge/router 306a is only able to receive and analyze the PIM-Hellos received on LSP_g and LSP_j. The second bridge/router 306b is only able to receive and analyze the PIM-Hellos received on LSP_h and LSP_i. FIGS. 9A-9C are diagrams used to help explain how the first bridge/router 306a implements the VPLS optimization method 400 and the aforementioned solution no. 2 (which involves PIM snooping) such that there will not be traffic replication on a single link 308, 312 or 314 when there is a failure (e.g., failure no. 1, 2 or 3).

Figure 9A:
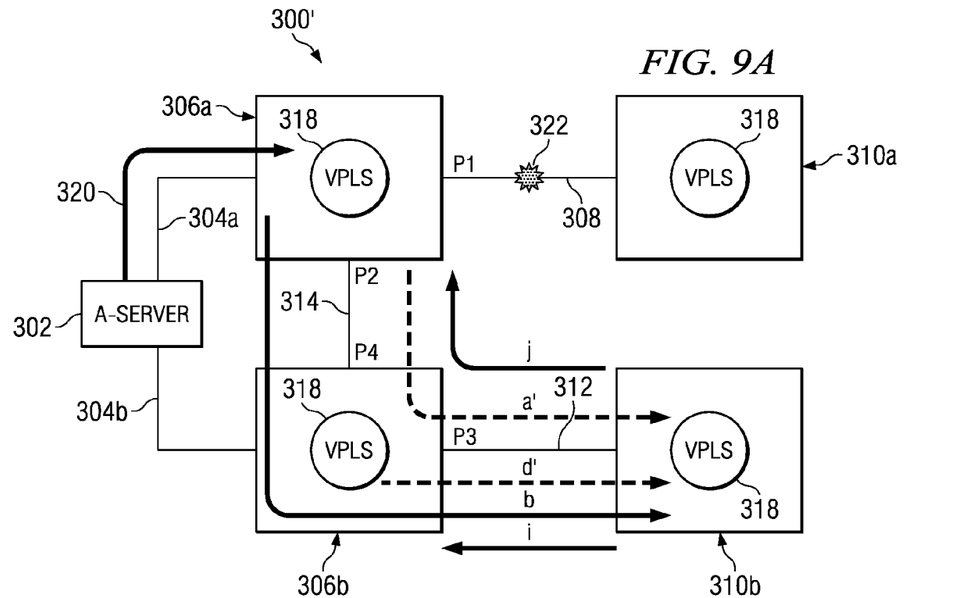
FIGS. 9A-9C are diagrams of the enhanced VHO which are used to explain how another embodiment of the VPLS optimization method (which utilizes solution no. 2) can prevent the data replication/bandwidth problem in accordance with the present invention.

FIG. 9A is a diagram of the VHO 300 in which there is a failure 322 on the link 308 located between the first bridge/router 306a and the first router 310a (failure no. 1 in FIG. 6). In the first 50 ms (or so) after the failure, the following occurs:

MPLS notices the failure 322 on link 308.

MPLS switches the impacted LSP_a and LSP_d to their backup LSP_a' and LSP_d' (FIG. 5 shows non-impacted LSP_a and LSP_d) (no backup LSPs are activated for the impacted LSPs g, h, e and f because they are associated with PIM-Hellos).

Then, within the first 50+processing_time ms after the failure, the following occurs:

The first bridge/router 306a (in particular the VPLS optimization method 400) is informed about the failure 322 (step 402).

The first bridge/router 306a knows that PIM-Hellos from the first router 310a where normally received on LSP_g but in this failure situation it deduces that it will not receive another PIM-Hello from the first router 310a.

The first bridge/router 306a ascertains that the second router 310b is the PIM designated router. Because, the first bridge/router 306a receives PIM-Hellos on LSP_j from the second router 310b.

The first bridge/router 306a accesses the VPLS FDB and determines that multiple LSPs namely LSP_b and LSP_a' would be used to flood/carry the same IP multicast traffic 320 out a single port "p2" (step 404).

The first bridge/router 306a knows that LSP_a' is for the first router 310a and that LSP_b is for the second router 310b (which is also the PIM designated router) and as a result suppresses the IP multicast traffic 320 on LSP_a' (see step 406).

Figure 9B:
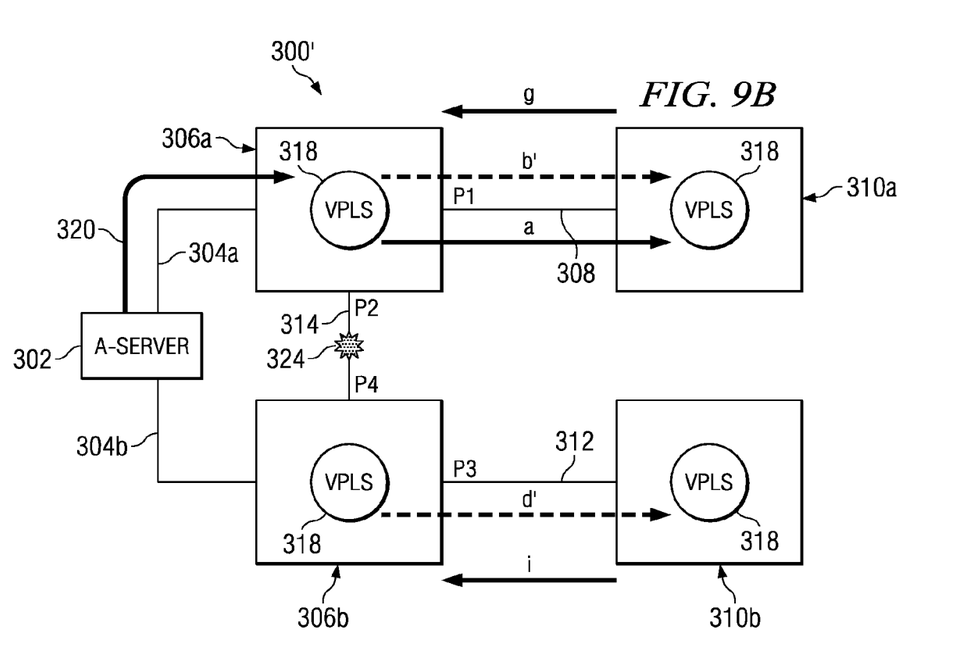

FIG. 9B is a diagram of the VHO 300 in which there is a failure 324 on the link 314 located between the first bridge/router 306a and the second bridge/router 306b (failure no. 2 in FIG. 6). In the first 50 ms (or so) after the failure, the following occurs:

MPLS notices the failure 324 on link 314.

MPLS switches the impacted LSP_b and LSP_d to their backup LSP_b' and LSP_d' (FIG. 5 shows non-impacted LSP_b and LSP_d) (no backup LSPs are activated for the impacted LSPs h, j, e and f because they are associated with PIM-Hellos).

Then, within the first 50+processing_time ms after the failure, the following occurs:

The first bridge/router 306a (in particular the VPLS optimization method 400) is informed about the failure 324 (step 402).

The first bridge/router 306a knows that PIM-Hellos from the second router 310b where normally received on LSP_j but in this failure situation it deduces that it will not receive another PIM-Hello from the second router 310b.

The first bridge/router 306a ascertains that the first router 310a is the PIM designates router. Because, the first bridge/router 306a receives PIM-Hellos on LSP_g from the first router 310b.

The first bridge/router 306a accesses the VPLS FDB and determines that multiple LSPs namely LSP_a and LSP_b' would be used to flood/carry the same IP multicast traffic 320 onto a single port "p1" (step 404).

The first bridge/router 306a knows that LSP_a is for the first router 310a (which is also the PIM designated router) and that LSP_b' is for the second router 310b and as a result suppresses the IP multicast traffic 320 on LSP_b' (see step 406).

Figure 9C:
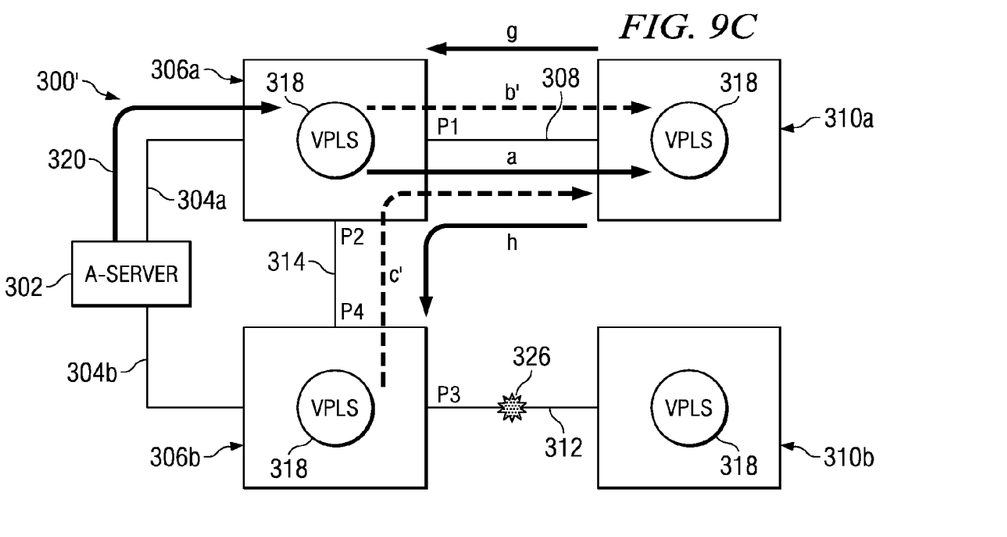

FIG. 9C is a diagram of the VHO 300 in which there is a failure 326 on the link 312 located between the second bridge/router 306b and the second router 310b (failure no. 3 in FIG. 6). In the first 50 ms (or so) after the failure, the following occurs:

MPLS notices the failure 326 on link 312.

MPLS switches the impacted LSP_b and LSP_c to their backup LSP_b' and LSP_c' (FIG. 5 shows non-impacted LSP_b and LSP_c) (no backup LSPs are activated for the impacted LSPs i, j, e and f because they are associated with PIM-Hellos).

Then, within the first 50+processing_time ms after the failure, the following occurs:

The first bridge/router 306a (in particular the VPLS optimization method 400) is informed about the failure 326 (step 402).

The first bridge/router 306a knows that PIM-Hellos from the second router 310b where normally received on LSP_j but in this failure situation it deduces that it will not receive another PIM-Hello from the second router 310b.

The first bridge/router 306a ascertains that the first router 310a is the PIM designated router. Because, the first bridge/router 306a receives PIM-Hellos on LSP_g from the first router 310a.

The first bridge/router 306a accesses the VPLS FDB and determines that multiple LSPs namely LSP_a and LSP_b' would be used to flood/carry the same IP multicast traffic 320 out a single port "p1" (step 404).

The first bridge/router 306a knows that LSP_a is for the first router 310a (which is also the PIM designated router) and that LSP_b' is for the second router 310b and as a result suppresses the IP multicast traffic 320 on LSP_b' (see step 406).

As can be seen, the first bridge/router 306a resolves these three fault scenarios by: (1) snooping the PIM-Hellos to ascertain whether the first router 310a or the second router 310b is the PIM designated router; (2) inspecting the VPLS FDB; and (3) determining which LSP(s) should have the IP multicast traffic 320 suppressed thereon by using the following rules:

```
if (there are multiple LSPs on a given port) then
    determine which LSP leads to the current PIM DR
    suppress traffic on the other LSPs.
endif
```

Note: to perform solution 2, the VPLS instance 318 needs to be deployed with enough LSPs and protection LSPs so that the first bridge/router 306a and the second bridge/router 306b always receive the PIM-Hellos as an end-point (or LER: Label Edge Router) of an LSP (no PIM snooping in intermediate LSP nodes, or LSR: Label Switching Routers). In this way, the first bridge/router 306a and the second bridge/router 306b can always reach the same conclusion as the one made by the first and second routers 310a and 310b as to which of those routers 310a or 310b is going to be the PIM designated router.

The following TABLE 1 identifies the actions to be taken at the first bridge/router 306a (1st B/R) and the second bridge/router 306b (2nd B/R) upon implementing the VPLS optimization method 400 for each of the eight possible failures that can occur in the enhanced VHO 300 (see FIG. 6). Note: there are no actions taken in the first router 310a (1st R) and the second router 310b (2nd R) because those devices do not implement the VPLS optimization method 400.

LSP_d in FIG. 5 these examples where configured differently to avoid a problem in failure no. 5).

Figure 11:
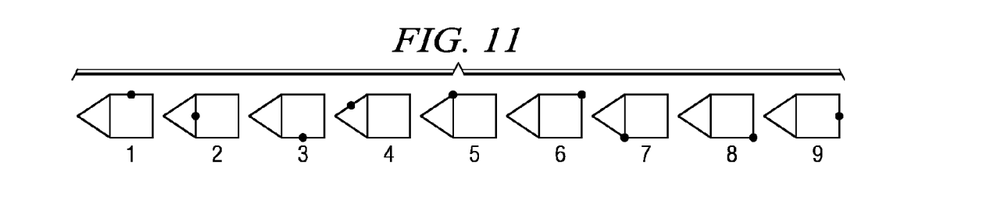
FIG. 11 is a diagram that illustrates the nine possible failures which could occur within the enhanced VHO shown in FIG. 10.

FIG. 11 illustrates nine possible failures which could occur within this particular architecture of the VHO 300'. Of these

TABLE 1

| | 1$^{st}$R PIM-Hellos | | | 2$^{nd}$R PIM-Hellos | | | 1$^{st}$ B/R | | 2$^{nd}$ B/R | | |
|---|---|---|---|---|---|---|---|---|---|---|---|
| | Snoop | | | Snoop | | | | | | | |
| | 1$^{st}$ B/R | Snoop 2$^{nd}$ B/R | To 2$^{nd}$ R | Snoop 1$^{st}$ B/R | 2$^{nd}$ B/R | To 1$^{st}$ R | Mcast traffic | Action | Mcast traffic | Action | DR |
| Normal | g | h | e | j | i | f | a/p1, b/p2 | — | — | — | 1$^{st}$R (a) |
| Failure 1 | — | — | — | j | i | — | a'/p2, b/p2 | suppress a'/p2 (since DR on b) | — | — | 2$^{nd}$R (b) |
| Failure 2 | g | — | — | — | i | — | a/p1, b'/p1 | suppress b'/p1 (since DR on a) | — | — | 1$^{st}$R (a) |
| Failure 3 | g | h | — | — | — | — | a/p1, b'/p1 | suppress b'/p1 (since DR on a) | — | — | 1$^{st}$R a) |
| Failure 4 | g | h | e | j | i | f | — | — | c/p3, d/p4 | — | 1$^{st}$R (d) |
| Failure 5 | g (lost) | h (lost) | e (lost) | j (lost) | i | f (lost) | — | — | c/p3, d/p4 (lost) | — | 2$^{nd}$R (d) |
| Failure 6 | — | — | — | j | i | f (lost) | a/p1 (lost), b/p2 | — | — | — | 2$^{nd}$R (b) |
| Failure 7 | g | h (lost) | e (lost) | j (lost) | i | f (lost) | a/p1, b/p2 (lost) | — | — | — | 1$^{st}$R (a) |
| Failure 8 | g | h | e (lost) | — | — | — | a/p1, b/p2 (lost) | — | — | — | 1$^{st}$R (a) |

Figure 10:
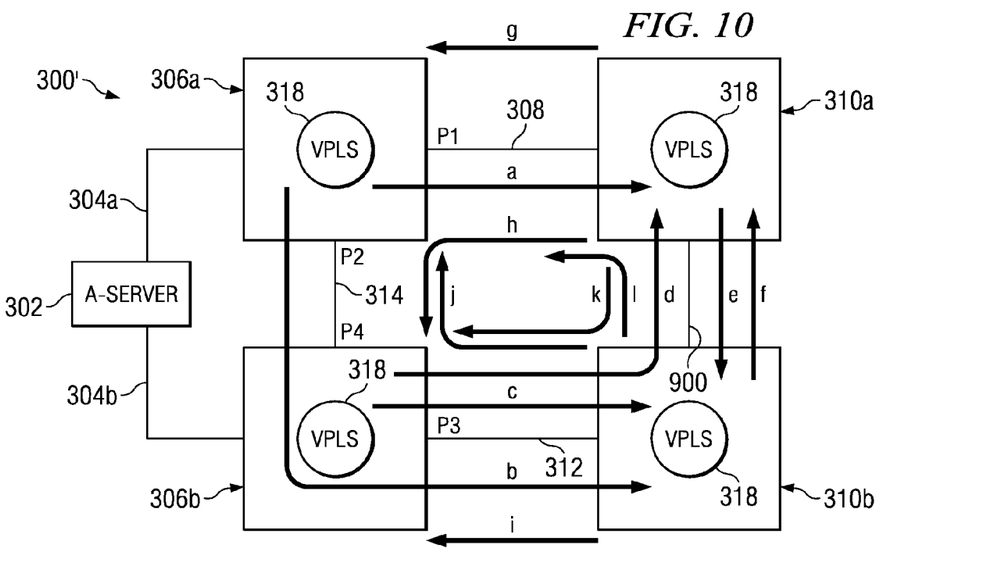
FIG. 10 is a block diagram of another enhanced VHO (which has a different architecture than the enhanced VHO shown in FIGS. 3A-3B) that is used to help describe how the VPLS optimization method can be used to solve the data replication/bandwidth problem in accordance with the present invention.

Referring to FIG. 10, there is a block diagram which illustrates another enhanced VHO 300' that is used to help describe how the VPLS optimization method 400 can be implemented to solve the aforementioned data replication/bandwidth problem in accordance with the present invention. The VHO 300' has the same architecture as VHO 300 except that it has a link 900 located between the first router 310a and the second router 310b. The block diagram illustrates the enhanced VHO 300' in a normal operating condition where LSP_a through LSP_k have been established to form the VPLS instance 318 between the first bridge/router 306a, the second bridge/router 306b, the first router 310a and the second router 310b (note LSP_d in FIG. 10 is not the same as nine possible failures: four of the failures occur on the links 308, 312, 314 and 900 (see failure nos. 1-3 and 9); one of the failures occurs on link 304a (see failure no. 4); and four of the failures occur in the first bridge/router 306a, the second bridge/router 306b, the first router 310a and the second router 310b (see failure nos. 5-8). Only five of these failures lead to the problematical traffic replication on a single link and these failures occur on the links 304a, 308, 312 and 314 and on the first bridge/router 306a (see failure nos. 1-5). How the first and second bridges/routers 306a and 306b implement the VPLS optimization method 400 and the aforementioned solution nos. 1 and 2 such that failure nos. 1-5 will not cause traffic replication on a single link is identified in TABLE 2.

TABLE 2

| | 1$^{st}$R PIM-Hellos (g, h, k, e) | | | 2$^{nd}$R PIM-Hellos (i, j, l, f) | | | 1$^{st}$R | | 2$^{nd}$R | | DR LSP |
|---|---|---|---|---|---|---|---|---|---|---|---|
| | Snoop | | | Snoop | | | | | | | |
| | 1$^{st}$ B/R | Snoop 2$^{nd}$ BR | To 2$^{nd}$ R | Snoop 1$^{st}$ B/R | 2$^{nd}$ B/R | To 1$^{st}$ R | Mcast traffic | Action | Mcast traffic | Action | Mcast traffic |
| Normal | g | h, k | e | j, l | i | f | a/p1, b/p2 | — | — | — | 1$^{st}$R (a) |
| Failure 1 | g' | k | e | j | i | f | a'/p2, b/p2 | suppress b/p2 | — | — | 1$^{st}$R (a') |

TABLE 2-continued

| | 1stR PIM-Hellos (g, h, k, e) Snoop | | | 2ndR PIM-Hellos (i, j, l, f) Snoop | | | | 1stR | | 2ndR | DR LSP |
|---|---|---|---|---|---|---|---|---|---|---|---|
| | 1st B/R | Snoop 2nd BR | To 2nd R | Snoop 1st B/R | 2nd B/R | To 1st R | Mcast traffic | Action | Mcast traffic | Action | Mcast traffic |
| Failure 2 | g | k | e | l | i | f | a/p1, b'/p1 | (since DR on a') suppress b'/p1 | — | — | 1stR (a) |
| Failure 3 | g | h | e | l | i' | f | a/p1, b'/p1 | (since DR on a) suppress b'/p1 | — | — | 1stR (a) |
| Failure 4 | g | h, k | e | j, l | i | f | — | (since DR) on a) — | c/p3, d/p3 | suppress c/p3 (since DR on d) | 1stR (d) |
| Failure 5 | — | h(lost), k | e | — | i | f | — | — | c/p3, d/p3 | suppress c/p3 (since DR on d) | 1stR (d) |
| Failure 6 | — | — | — | j, l(lost) | i | — | a/p1 (lost), b/p2 | — | — | — | 2ndR (b) |
| Failure 7 | g | — | e | j(lost), l | — | f | a/p1, b/p2 (lost) | — | — | — | 1stR (a) |
| Failure 8 | g | h | — | — | — | — | a/p1, b/p2 (lost) | — | — | — | 1stR (a) |
| Failure 9 | g | h | — | j | i | — | a/p1, b/p2 | — | — | — | 1stR (a) |

To implement solution no. 1, the first bridge/router 306a can resolve fault nos. 1-3 and the second bridge/router 306b can resolve fault nos. 4-5 by using these hard-coded rules:

```
if (LSP a' on p2 and LSP b on p2 are active) then
    suppress traffic on LSP b
endif
if (LSP a on p1 and LSP b' on p1 are active) then
    suppress traffic on LSP b'
endif
if (LSP c on p3 and LSP d on p3 are active), then
    suppress traffic on LSP c
In all other LSP/port situations, no suppression
is forced.
```

And, to implement solution no. 2, the first bridge/router 306a can resolve fault nos. 1-3 and the second bridge/router 306b can resolve fault nos. 4-5 by using these rules:

```
if (there are multiple LSPs on a given port) then
    determine which LSP leads to the current PIM DR
    suppress traffic on the other LSPs.
endif
```

From the foregoing, it should be appreciated that the VPLS optimization method 400 can be implemented quickly and at a minimal cost within existing bridges/routers. Plus, the VPLS optimization method 400 can be implemented without having to revise existing standards. Solution No. 1 is the quickest to implement, but is limited to a specific/known architecture of the network (including bridges/routers and routers). In contrast, solution no. 2 can handle many more architectures and topologies, but requires the use of PIM Snooping. Both solutions can be applied to networks which have architectures that are different than the ones shown herein with respect to VHO 300 and VHO 300'. In fact, both solutions can be applied to networks which have nothing to do with a VHO or an IPTV transport network.

Although two embodiments of the present invention have been illustrated in the accompanying drawings and described in the foregoing detailed description, it should be understood that the invention is not limited to the embodiments disclosed, but is capable of numerous rearrangements, modifications and substitutions without departing from the spirit of the invention as set forth and defined by the following claims.

What is claimed is:

1. A method implemented within a bridge/router for avoiding packet replication when there is a failure in a network, said method comprising the steps of:
    determining by the bridge/router if multiple label switch paths would be used to carry Internet Protocol (IP) traffic out of a single port of the bridge/router when there is a failure in the network; and
    if yes, choosing one of the label switch paths to carry the IP traffic out the single port and then preventing the IP traffic from being carried on the remaining label switch path(s) out the single port which avoids the packet replication on a link which is associated with the single port;
    if no, allowing the IP traffic to be carried on the label switch paths.

2. The method of claim 1, wherein said determining step further includes accessing at least one forwarding database to determine if multiple label switch paths are to be used to carry the IP traffic out of the single port.

3. The method of claim 1, wherein if a topology of said network is known then said choosing step further includes applying hard-coded rules to choose the label switch path which is going be used to carry the IP traffic out of the single port.

4. The method of claim 1, wherein if a topology of said network is not known then said choosing step further includes:
   snooping messages transmitted from a plurality of routers;
   determining which router from the plurality of routers is a designated router; and
   choosing the label switch path which leads to the designated router to be the one to carry the IP traffic out of the single port.

5. A bridge/router, comprising:
   a processor;
   a memory; and
   instructions which are accessible from said memory and processable by said processor to avoid packet replication when there is a failure in a network by:
      determining if multiple label switch paths would be used to carry Internet Protocol (IP) traffic out of a single port when there is a failure in the network; and
      if yes, choosing one of the label switch paths to carry the IP traffic out the single port and then preventing the IP traffic from being carried on the remaining label switch path(s) out the single port which avoids the packet replication on a link which is associated with the single port;
      if no, allowing the IP traffic to be carried on the label switch paths.

6. The bridge/router of claim 5, wherein said processor facilitates said determining operation by accessing at least one forwarding database to determine if multiple label switch paths are to be used to carry the IP traffic out of the single port.

7. The bridge/router of claim 5, wherein if a topology of said network is known then said processor facilitates said choosing operation by applying hard-coded rules to choose the label switch path which is going to be used to carry the IP traffic out of the single port.

8. The bridge/router of claim 5, wherein if a topology of said network is not known then said processor facilitates said choosing operation by:
   snooping messages transmitted from a plurality of routers;
   determining which router from the plurality of routers is a designated router; and
   choosing the label switch path which leads to the designated router to be the one to carry the IP traffic out of the single port.

9. A video hub office, comprising:
   a first bridge/router;
   a second bridge/router;
   a first router; and
   a second router;
   wherein each of said first bridge/router and said second bridge/router avoid packet replication during a failure in a network by determining if multiple label switch paths (LSPs) would be used to carry Internet Protocol (IP) traffic out of a single port when there is a failure in the network; and
      if yes, choosing one of the label paths to carry the IP traffic out the single port and then preventing the IP traffic from being carried on the remaining label switch path(s) out the single port which avoids the packet replication on a link which is associated with the single port; and
      if no, allowing the IP traffic to be carried on the label switch paths.

10. The video hub office of claim 9, wherein each of said first bridge/router and said second bridge/router facilitates said determining step by accessing at least one forwarding database to determine if multiple label switch paths are to be used to carry the IP traffic out of the single port.

11. The video hub office of claim 9, wherein each of said first bridge/router and said second bridge/router facilitates said choosing step by applying hard-coded rules to choose the label switch path which will be used to carry the IP traffic out of the single port.

12. The video hub office of claim 9, wherein each of said first bridge/router and said second bridge/router facilitates said choosing operation by:
   snooping messages transmitted from a plurality of routers;
   determining which router from the plurality of routers is a designated router; and
   choosing the label switch path which leads to the designated router to be the one to carry the IP traffic out of the single port.

* * * * *